(12) United States Patent
Meyer et al.

(10) Patent No.: US 6,289,378 B1
(45) Date of Patent: Sep. 11, 2001

(54) WEB BROWSER REMOTE COMPUTER MANAGEMENT SYSTEM

(75) Inventors: Barry D. Meyer; Tim O. Lesniak, both of Houston, TX (US)

(73) Assignee: TriActive Technologies, L.L.C., Austin, TX (US)

( * ) Notice: Subject to any disclaimer, the term of this patent is extended or adjusted under 35 U.S.C. 154(b) by 0 days.

(21) Appl. No.: 09/175,788

(22) Filed: Oct. 20, 1998

(51) Int. Cl.[7] .................................................. G06F 11/30
(52) U.S. Cl. ............................................. 709/223; 709/202
(58) Field of Search ..................................... 709/223, 202

(56) References Cited

U.S. PATENT DOCUMENTS

| | | | |
|---|---|---|---|
| 5,742,762 | * | 4/1998 | Scholl et al. ............... 709/200 |
| 5,908,469 | * | 6/1999 | Botz et al. .................. 713/201 |
| 5,968,116 | * | 10/1999 | Day, II et al. .............. 709/202 |
| 5,996,010 | * | 11/1999 | Leong et al. ................ 709/223 |
| 5,999,179 | * | 12/1999 | Kekic et al. ................. 345/349 |
| 6,006,333 | * | 12/1999 | Nielsen ....................... 713/202 |
| 6,044,465 | * | 3/2000 | Dutcher et al. ............. 713/200 |
| 6,088,515 | * | 7/2000 | Muir et al. .................. 709/217 |
| 6,145,001 | * | 11/2000 | Scholl et al. ............... 709/223 |

* cited by examiner

Primary Examiner—Kenneth R. Coulter
(74) Attorney, Agent, or Firm—Brobeck, Phleger & Harrison LLP (57) ABSTRACT

A computer management system capable of managing computer programs, computer files, computer settings, peripheral settings and the like is controlled through the use of agents on the computers and a remote accessing program. The remote accessing program, in a preferred embodiment, can be a commercial web browser. The user can use the remote accessing program from any computer to reach the agent on the computer. After being recognized by the agent, the user can make any adjustments to the computer through the agent.

21 Claims, 13 Drawing Sheets

FIG. 3B $$BETA_WARNING$$
HARDWARE INFORMATION ON $$WIN_COMPUTER_NAMES$$          Help

| Group By | Device Class | IRQ | DMA | I/O | Memory |

Class   Hardware in this Class

• $$CLASS_DISPLAY_NAME$$   — 410

$$DESCRIPTION$$   — 420

| TriActive Remote Manager | SYSTEM IDENTIFICATION | | 550 | | Help |
|---|---|---|---|---|---|
| ▷General Summary Annotations Find 525 Help 530 ▷Network Neighborhood Tools TCP/IP Windows | Computer: Description: Owner: User Login: Organization: OS: Version: Time/Date: Time Zone: | CPQ5D101 — 505 WINDX 2A desktop build — 510 CPQ5D101 — 515 Bh1 — 520 Brobeck, Phlegar, Harrison Windows 95 (OBR2) 4.00.1111 — 535 2:19:9 PM 10/6/1990 — 540 Central Standard Time — 545 | | | CPQ5Q101'S Desktop Display: Full screen 60% 80% |

| ▷System Components DOS File Systems Hardware Printers Process Registry Software Shutdown Time/Date ▷Options About Admin QuickUpdate Welcome | FILE SYSTEM ON CPQ5D101 | | | | | 555 Help |
|---|---|---|---|---|---|---|
| | Label | Type | Size | Free | %Free | Properties |
| | (A:) | 3 1/2 Inch Floppy | | | 0% | ▯ |
| | (C:) LOCAL | Local | 1.17GB | 1.88MB | 15% | ▯ |
| | (D:) | Local | 1.50GB | 1.80GB | 99% | ▯ |
| | (E:) | CD-ROM | | | 0% | ▯ |
| | (F:) APPS | Network | 2.00GB | 2.00GB | 100% | ▯ |
| | (G:) HOME | Network | 2.00GB | 2.00GB | 100% | ▯ |
| | (H:) HOME | Network | 2.00GB | 2.00GB | 100% | ▯ |
| | (I:) PCDOCS | Network | 2.00GB | 2.00GB | 100% | ▯ |
| | (J:) PCDOCS | Network | 2.00GB | 2.00GB | 100% | ▯ |
| | (R:) CDDATA | Network | 2.00GB | 642MB | 31% | ▯ |
| | (T:) APPS | Network | 2.00GB | 2.00GB | 100% | ▯ |
| | (Z:) SYSTEM | Network | DIVMB | 461MB | 46% | ▯ |

| NETWORK NEIGHBORHOOD | Help |
|---|---|
| 🖳Network Neighborhood | |

| PRINTERS | | | | | Help |
|---|---|---|---|---|---|
| Printer | Port | Jobs | Status | Properties | |
| 🖨HP LaserJet SS1 | LPT1: | 0 | Idle | | |

| SYSTEM INFORMATION | Help |
|---|---|

FIG. 5

HARDWARE INFORMATION ON CPQ5D101  Help

TriActive Remote Manager

▷ General
　Summary
　Annotations
　Find
　Help
▷ Network
　Neighborhood
　Tools
　TCP/IP
　Windows
▷ System
　Components
　DOS
　File Systems
　Hardware
　Printers
　Process
　Registry
　Software
　Shutdown
　Time/Date
▷ Options
　About
　Admin
　QuickUpdate
　Welcome

| Group By | ▷ Device Class | IRQ | DMA | I/O | Memory |

| Class | Hardware in this Class |
|---|---|
| | • CDROM |
| |     SONY CD-ROM CDU571-O |
| | • Disk drives |
| |     GENERIC IDE DISK TYPE01 |
| |     GENERIC NEC FLOPPY DISK |
| | • Display adaptors |
| |     Compaq S3 ViRGE/GX PCI V1.70 |
| | • Floppy disk controllers |
| |     Standard Floppy Disk Controller |
| | • Hard disk controllers |
| |     Primary IDE controller (dual fifo) |
| |     Secondary IDE controller (dual fifo) |
| |     VIA Tech PCI Bus Master IDE Controller |
| 610 → | • Keyboard |
| |     Standard 101/102-Key or Microsoft Natural Keyboard ← 620 |
| 610 → | • Monitor |
| |     (Unknown Monitor) ← 620 |
| 610 → | • Mouse |
| |     Standard PS/2 Port Mouse ← 620 |
| | • Network adapters |
| |     Compaq Netelligent 10/100 TX Embedded UTP Controller |
| |     Dial-Up Adapter |
| | • Other devices |
| |     ? PCI Early non-VGA Device |
| |     ? PCI Universal Serial Bus |

WEB BROWSER REMOTE COMPUTER MANAGEMENT SYSTEM

TECHNICAL FIELD

This patent application is related, in general, to management of computer systems and in particular to a remote computer management system using a web browser.

BACKGROUND

As the usage of computers increases in various computer industries, it has become increasingly difficult and expensive for businesses to manage such computers and any network systems to which such computers belong. Generally, in order to make minute adjustments to computers on a network system, an information technology specialist will have to go to the computer station in order to make changes, such as changing the printer for the computer. Other methods including guiding the user over the phone in order make the requisite changes. These methods are fairly unwieldy and inefficient. Studies have indicated that the cost of ownership of a single corporate desktop personal computer amounts to over $30,000 over the three-year lifetime of the computer. Most of this cost is associated with management and maintenance-related activities. An added difficulty is that computing environments differ greatly from company to company, therefore it is difficult to provide management and maintenance services that can accommodate various entities.

There is a need in the art to develop a computer management system that allows remote access to computers with sufficient options for utilization.

SUMMARY OF THE INVENTION

A computer management system capable of managing computer programs, computer files, computer settings, peripheral settings and the like is controlled through the use of agents on the computers and a remote accessing program. The remote accessing program, in a preferred embodiment, can be a commercial web browser. The user can use the remote accessing program from any computer or device to reach the agent on the computer. After being recognized by the agent, the user can make any adjustments to the computer through the agent.

A primary object of the invention is to provide a remote computer management system.

Yet another object of the present invention is to provide a remote computer management system wherein access is obtained through a commercial web browser.

A further object of the invention is to allow a remote user a view of pre-selected software and hardware information on a given computer.

It is still another object of the invention to provide a remote computer management system capable of making changes to a number of computers simultaneously.

It is another object of the invention to provide a remote computer management system capable of monitoring application response times and performance on a given computer.

Another object of the present invention is to provide a remote computer management system, which is not memory intensive.

The above objects of the invention and the brief description of the preferred embodiment should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE FIGURES

For a more complete understanding of the present invention and the advantages thereof, reference should be made to the following Detailed Description taken in connection with the accompanying drawings in which.

DETAILED DESCRIPTION

Many businesses have attempted to increase productivity among its workers by incorporating computer network systems to allow their employees access to shared working files and to communicate internally. However, even though computers can increase productivity, any down time experienced on the part of the user can negatively impact performance due to increasing reliance on computers. Therefore, even minor maintenance or adjustments to a computer can hinder productivity in the workplace. The present inventions lessens the impact of maintenance and adjustments by placing a low memory agent onto a client computer to allow remote access and editing.

Figure 1:
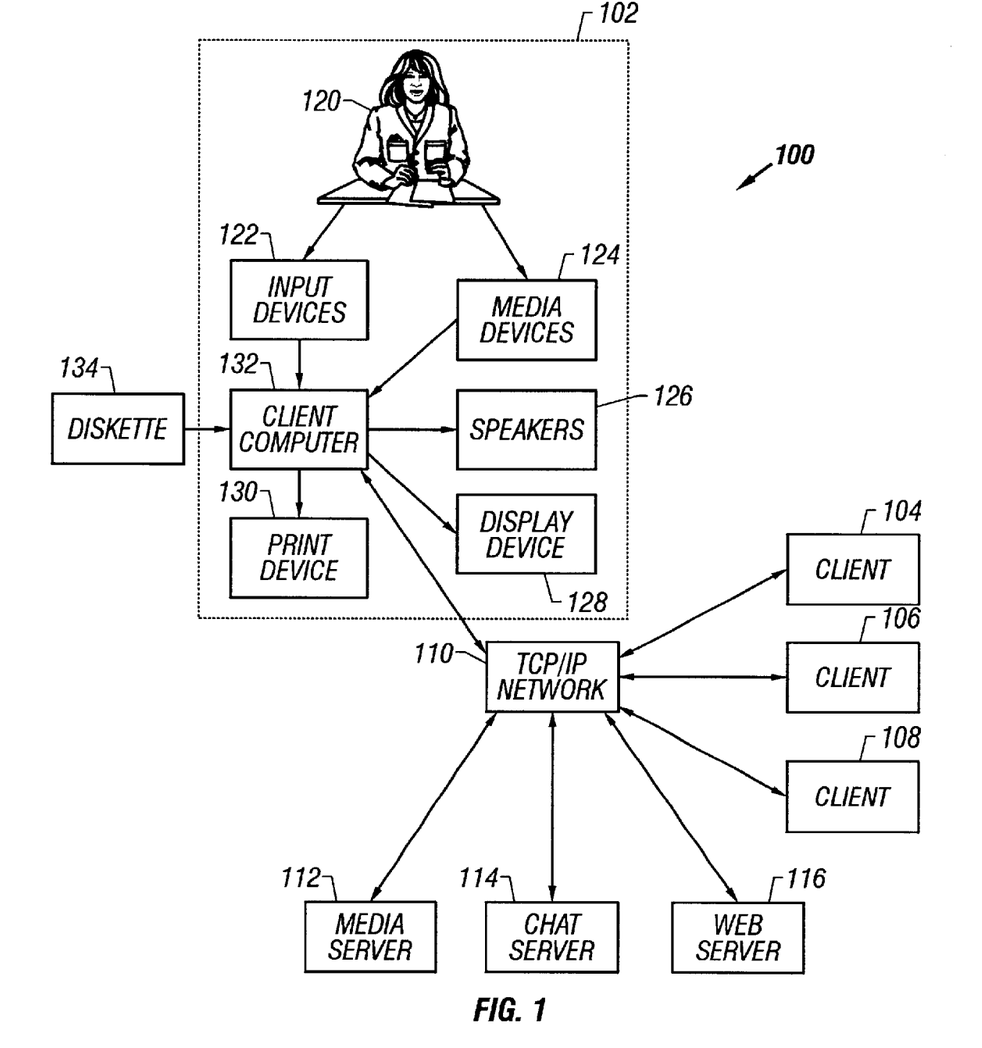
FIG. 1 is a block diagram of a computer network.

FIG. 1 is a block diagram of a computer network system 100. The computer network system 100 includes a Transmission Control Protocol/Internet Protocol (TCP/IP) network 110 and servers 112, 114 and 116 that are coupled through TCP/IP network 110 to each of clients 102, 104, 106 and 108. Through TCP/IP network 110, information is communicated by servers 112, 114 and 116, and by clients 102, 104, 106 and 108 to one another.

Clients 102, 104, 106 and 108 are substantially identical to one another. Client 102 is a representative one of clients 102, 104. 106 and 108. Client 102 includes a user 120, input devices 122, media devices 124, speakers 126, a display device 128, a print device 130 and a client computer 132, and a storage device 134. Client computer 132 is connected to input devices 122, media devices 124, speakers 126, display device 128, print device 130, and storage device 134. Display device 128 is, for example, a conventional electronic cathode ray tube. Print device 130 is, for example, a conventional electronic printer or plotter. Storage device 134 is, for example, a hard drive.

User 120 and client computer 132 operate in association with one another. For example, in response to signals from client computer 132, display device 128 displays visual images, and user 120 views such visual images. Also, in response to signals from client computer 132, print device 130 prints visual images on paper, and user 120 views such visual images. Further, in response to signals from client computer 132, speakers 126 output audio frequencies, and user 120 listens to such audio frequencies. Moreover, user 120 operates input devices 122 and media devices 124 in order to output information to client computer 132, and client computer 132 receives such information from input devices 122 and media devices 124.

Input devices 122 include, for example, a conventional electronic keyboard and a pointing device such as a conventional electronic "mouse", rollerball or light pen. User 120 operates the keyboard to output alphanumeric text information to client computer 132, and client computer 132 receives such alphanumeric text information from the keyboard. User 120 operates the pointing device to output cursor-control information to client computer 132, and client computer 132 receives such cursor-control information from the pointing device.

User 120 operates media devices 124 in order to output information to client computer 132 in the form of media signals, and client computer 132 receives such media signals from media devices 124. Media signals include for example video signals and audio signals. Media devices 124 include, for example, a microphone, a video camera, a videocassette player, a CD-ROM (compact disc, read-only memory) player, and an electronic scanner device.

In the preferred embodiment of the invention, a web browser is accessed from a computer connected to either a local network or the World Wide Web. Referencing FIG. 2, which illustrates a high-level diagram of the management system 200, the web browser 210 is used by an administrator to access an agent 215 residing on a client computer 132. In the preferred embodiment, the agent will be installed and stored locally on each client computer. In an alternative embodiment, the agent can be installed on a network server, but will be executed on local client computers.

Figure 2:
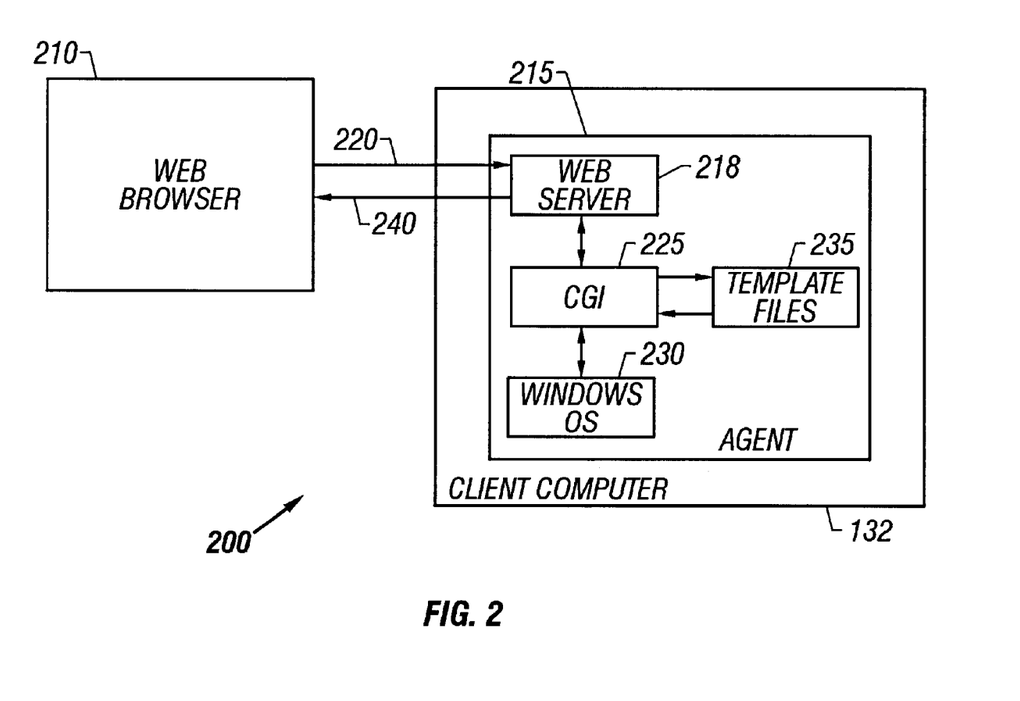
FIG. 2 is a relationship diagram showing the remote managing system.

In the preferred embodiment, the administrator accesses 220 the agent 215 by typing in a standard Uniform Resource Locator (URL) or by clicking on a URL "link" from a web page. The web browser 210 makes a request to the agent 215 preferably via HTTP for access. Alternative embodiments of the agent can also accept requests using secure HTTP (SHTTP) protocol using Secure Sockets Layer (SSL).

The agent 215 has a component that operates essentially as a specialized web server 218 which processes system information. Once access is granted, the agent preferably executes a Common Gateway Interface (CGI) 225 program which pulls selected data from the operating system of the computer 230. The information is organized through the use of template files 235, preferably in HTML, which take the data and organizes them for viewing 240 by the web browser through the specialized web server.

A CGI program is a standard for interfacing applications with information servers, such as HTTP or Web servers. A CGI program is executed in real-time so that it can output dynamic information as opposed to static documents such as HTML documents. In essence, the CGI program is executed to transmit or request information, receive the results and then display them to the administrator. It acts as a gateway.

A CGI program can be written in any language that allows it to be executed on the system, such as C, C++, Java, Fortran, PERL, TCL, Visual Basic, etc. In the preferred embodiment of the present invention, a CGI is used as the interface, but other types of programs can also be utilized., such as Internet Server Application Programming Interface (ISAPI).

Figure 3A:
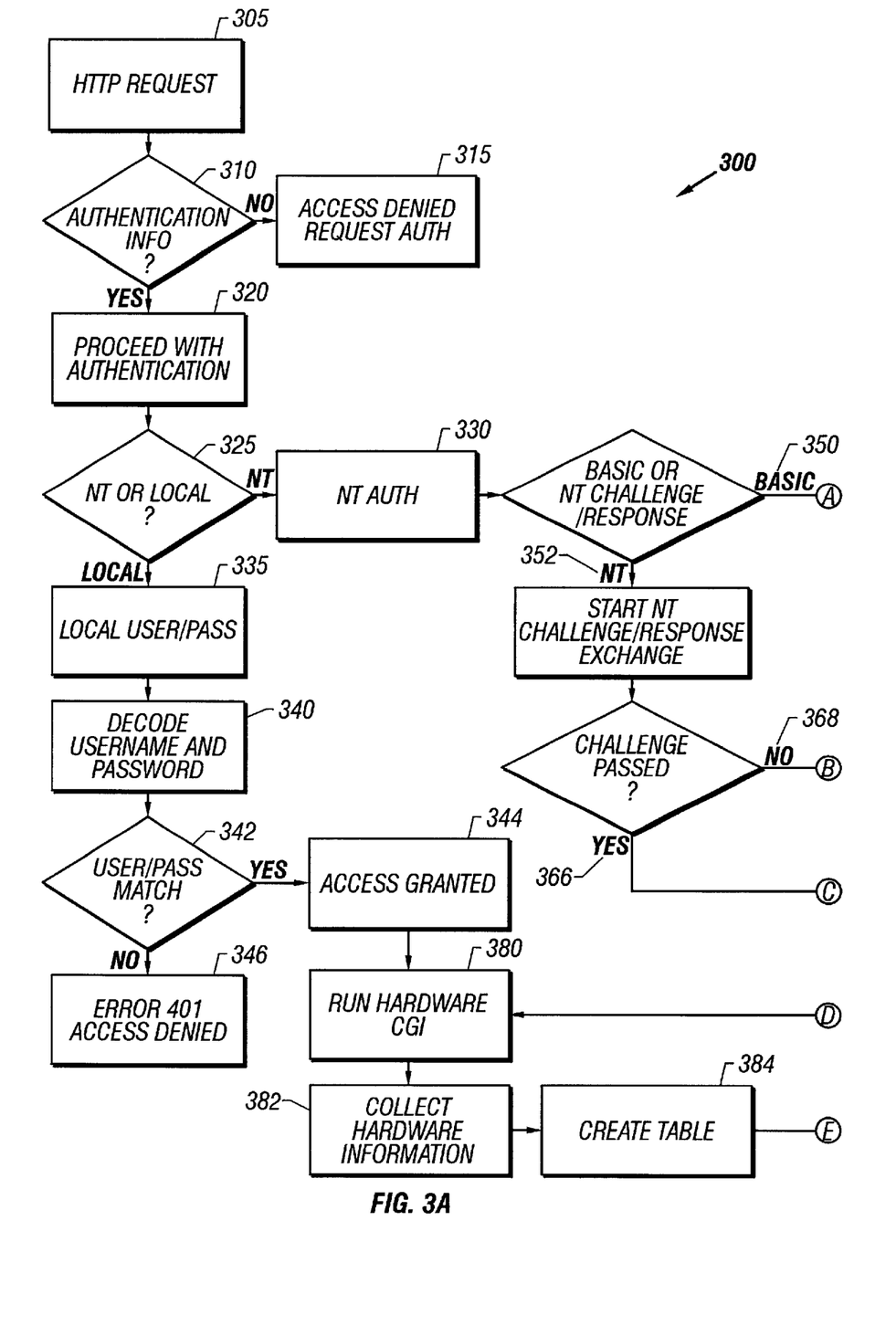
FIG. 3 is a detailed flowchart illustrating the remote managing system.
Figure 3B:
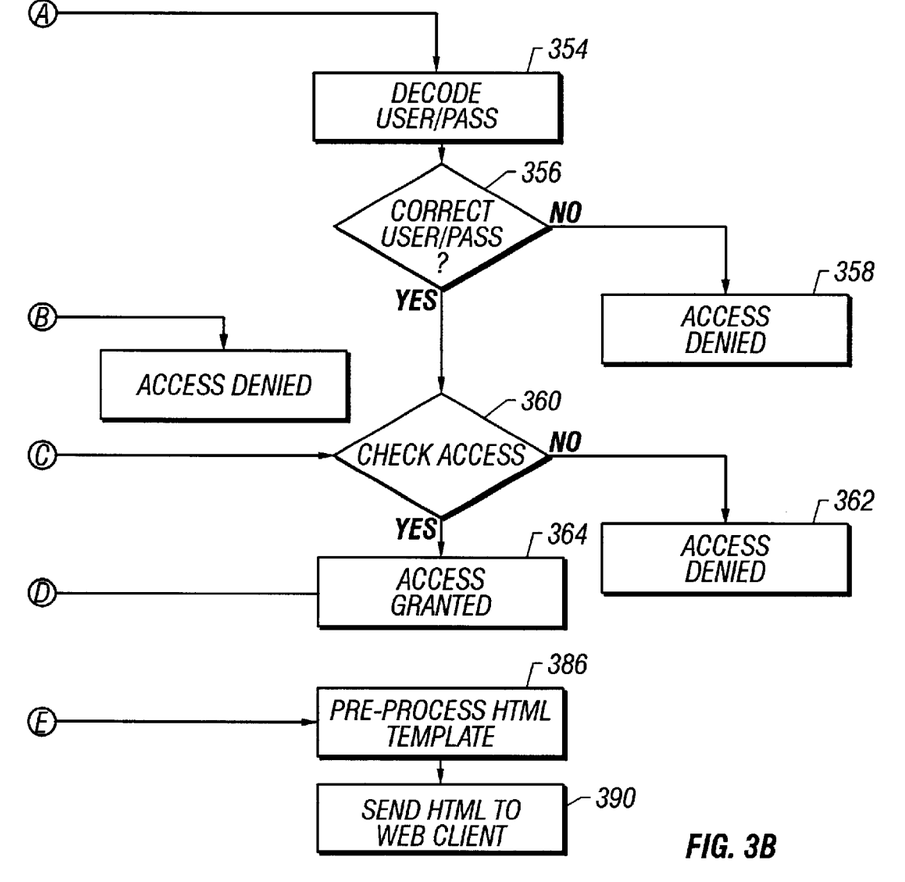

To better illustrate the management process, FIG. 3 is a flowchart 300 of a preferred embodiment illustrating how a hardware listing is obtained by the administrator. In the flowcharts described herein, including FIGS. 3, 7 and 10, the reference numerals refer to process steps. As shown in FIG. 3, the web server portion of the agent receives an HTTP request from a web browser 305. The agent checks to see if the request has provided authentication information 310. If no authentication information was provided in the initial HTTP request, an access denied message would be issued with a return request that authentication information needs to be provided 315. Such authentication information will need to correspond to the agent's security configuration in order to allow access.

When proceeding 320, in the preferred embodiment, the authentication process can be configured in two ways 325. The preferred configuration scheme is to authenticate against Windows NT 330. An alternative configuration is to use locally stored username and passwords 335.

In the locally stored configuration, the username and password are decoded 340. The username and password are matched against the locally stored username and password 342. If a match occurs, access is granted 344. If not, access is denied 346. If access is granted, then the appropriate CGI program will be executed, which, in this case, is the hardware CGI program 380.

The Windows NT authentication can use either the Basic 350 or the NT challenge/response exchange 352. In Basic 350, the username and password have been sent coded from the web client. The username and password are decoded 354 to authenticate them against the Windows NT domain. The decoded username and password are then authenticated 356. If they are incorrect, access is denied 358. If correct, an access check occurs 360. In a preferred embodiment, a group and/or users are configured to allow access to the agent. Therefore, the authentication scheme undergoes another check against an access group determined by the implementor of the system. If the user of the browser fails this access check, then access is denied 362. If the check succeeds, then access is granted 364.

Under the NT challenge/response exchange, the Windows NT domain issues a "challenge" to the remote user who will be prompted for their username and password. The "challenge" process avoids sending the user's password through HTTP protocol as clear text. If the "challenge" is passed 366, then the user proceeds to the access check 360. If the "challenge" is not passed, then access is denied 368.

After access is granted, the agent executes a specified CGI 380. In the preferred embodiment, a hardware CGI is executed to collect hardware information and return this information to the administrator. When the hardware CGI is executed, it obtains a list of the hardware devices that have been identified by the operating system 382. For example, in a Windows environment, the information is obtained from the Windows registry which is used by the Windows 95/98 operating system to store configuration information. In the preferred embodiment, the obtained hardware information is then formatted into a table that can be used by an HTML template substitution engine 384. Each row of the table corresponds to a hardware device containing information like name, device class, vendor, driver information, etc. The HTML template substitution engine pre-processes the HTML template file for the hardware listing and substitutes the information contained in the hardware table into the HTML template 386. The resulting HTML information generated from this process is sent back as a web page to the administrator through the web browser 390.

Figure 4:
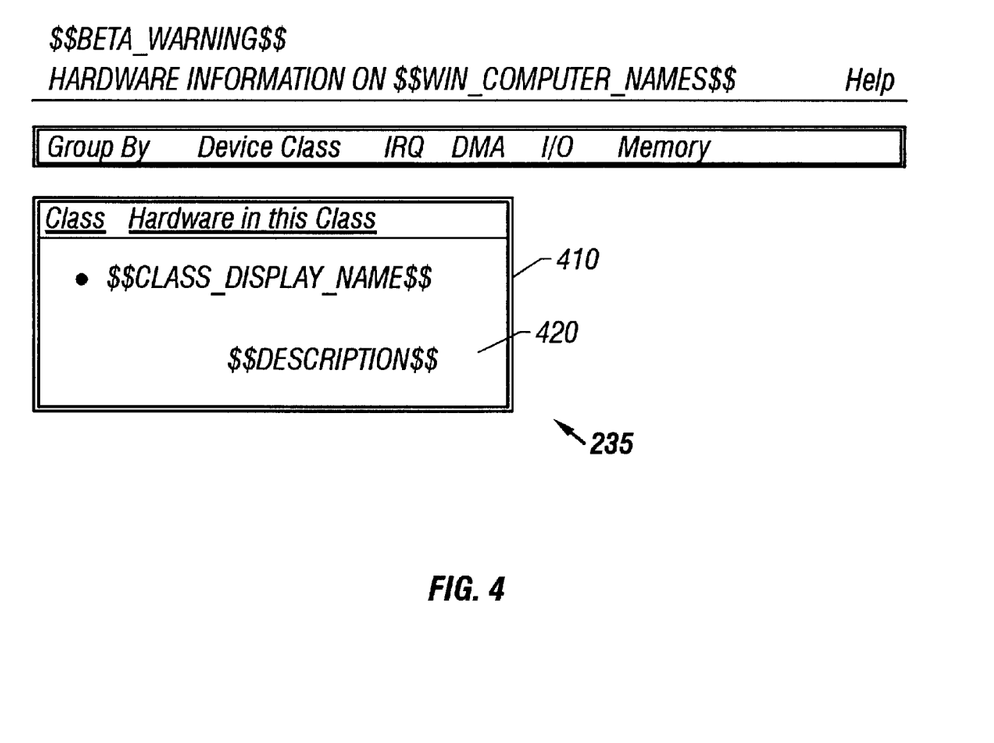
FIG. 4 is an example of a template.

The hardware template 235, as shown and discussed in relation to FIGS. 2 and 3, is presented in further detail in FIG. 4. In the preferred embodiment, the template 235 is programmed in HTML and places the data obtained from the operating system in a web page to be viewed by the administrator through the web browser. In the hardware template, the data is preferably divided into a table with the name of the device 410 and a description of the device 420.

Alternative embodiments of the template and template engines include programming in extensible Markup Language (XML) or any other markup languages.

Figure 5:
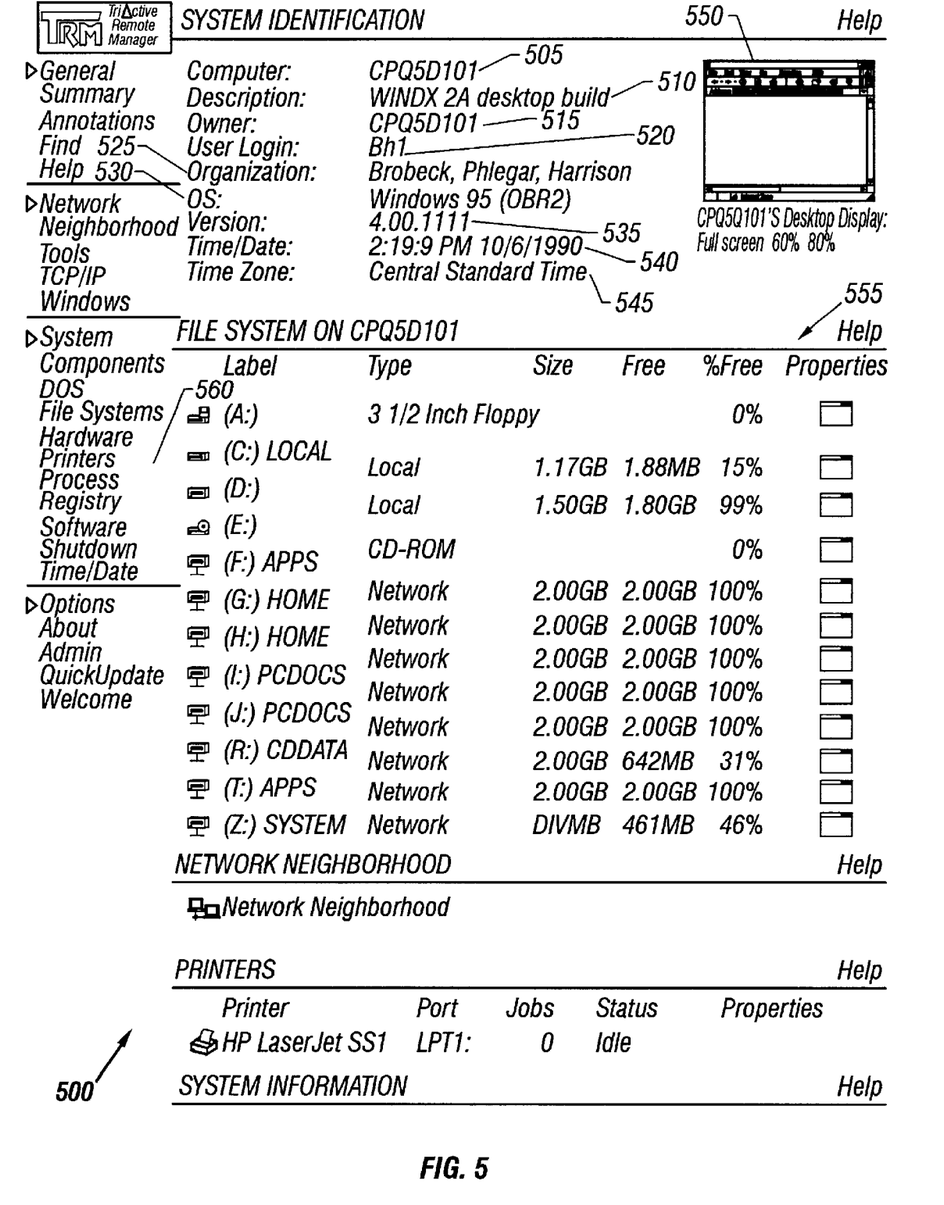
FIG. 5 is a sample summary page of an executed template.

FIG. 5 is a sample summary page of a web page 500 as accessed by the administrator through the web browser. The summary page 500 can include a number of elements such as the identification information of the computer as well as other information that provides an overview of the system. The identification information includes the computer identification number 505, the type of computer 510, the owner of the computer 515, the user login 520, the organization 525, the operating system 530, the version 535, the time and date 540, and the time zone 545. The desktop display of the client computer can also be displayed 550. The various drives 555 are displayed as file systems.

More in-depth looks at the client computer can be obtained through the sidebar options 560 that are provided on the summary page or by choosing the file systems 555. A representative page, the Hardware page under the System option, as shown in FIG. 6, is discussed below to show how a more detailed view or in-depth modification of the client computer can be obtained.

The summary page also includes information about the network hardware adapter and the corresponding TCP/IP networking configuration. In the preferred embodiment, the agent will allow the administrator to change a variety of network settings, such as host name, domain name, IP address, DHCP settings, DNS settings, subnet mask, and gateway. In a Windows® environment, the Windows® name, description, and workgroup can also be modified.

Figure 6:
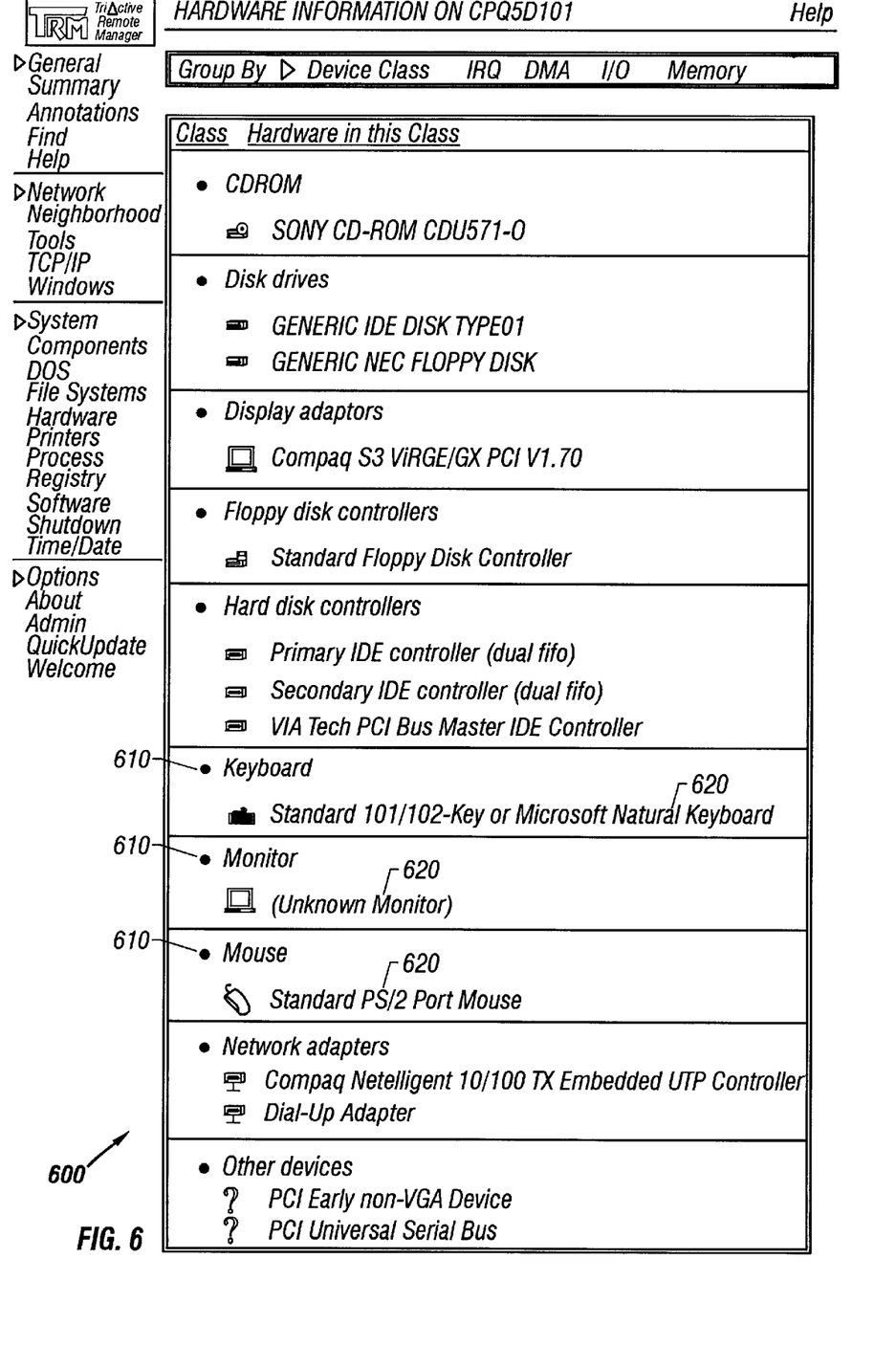
FIG. 6 is a sample hardware page of an executed template.

In the preferred embodiment, the Hardware page 600, shown in FIG. 6, can provide in more detail a number of the hardware features of the client. The Hardware page is derived from the hardware template shown in FIG. 4. It is accessed from the summary page 500 in FIG. 5 by clicking the Hardware option in sidebar 560. The bolded titles of the hardware apparatus 610 is the executed display name 410 from the hardware template. The description of the apparatus 620 is the description 420 on the executed template. In both circumstances, the information to fill out the template was obtained from the operating system 230 on the client computer 132 (referencing back to FIG. 2).

The hardware options can include the CD-ROM drive, the disk drive, the disk drive controllers, the monitor, the video card, the hard drive, the hard drive controller, the keyboard, the mouse, the network card, the printer, game cards, and any other peripherals that are covered under the agent's request. By allowing links to pages with more detailed client computer information, the agent can be customized to whatever level of detail is required by the administrator.

Other activities that can be performed through the agent include file system browsing, process viewing, network tools, software inventory, system shutdown/reboot, etc. Even though some of the features of file system browsing have been previously discussed, a general (though not complete) list of the file system browsing and editing features include uploading and downloading files, running executable files on the client computer, viewing drive and file properties, editing remote text files, creating new folders, renaming files, deleting files, and finding files. The process viewing functionality allows the administrator to view path and process ID information, to view thread, priority and module information, and to kill processes on the client computer. In addition, from the remote site, the administrator can use basic network tools, such as Ping, Tracert, Arp, and Netstat, to diagnose possible network problems. The administrator can also view all the software installed on the client computer as well as shutdown or reboot the client computer.

Figure 7:
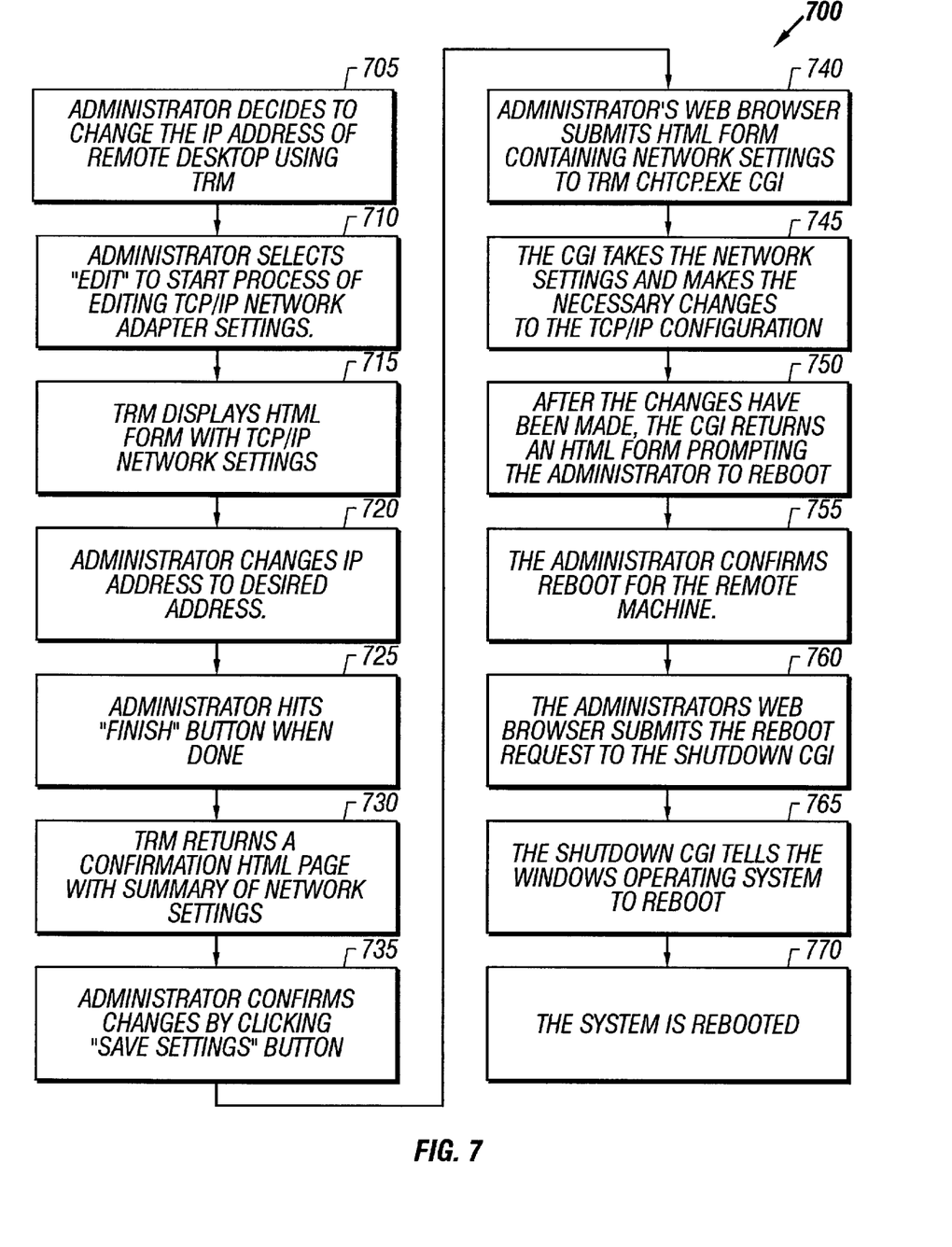
FIG. 7 is a flowchart of a remote change.

After pulling up the relevant information pages, the administrator can make modifications through the agent. To better illustrate how the agent processes commands, FIG. 7 is a flowchart 700 of a preferred embodiment indicating how the administrator changes the network IP address on the client computer 705. As shown in FIG. 7, the administrator can change the TCP/IP network settings 710 by choosing to edit these settings for an active network adapter on the summary page 500. In response to the Edit change, the agent returns the network settings in HTML form 715. The administrator can then change the network IP address 720 and confirm the change by clicking the finish button 725. Clicking the finish button submits changes in the network settings to the agent. The agent then returns a summary of the new TCP/IP network configuration to be confirmed by the Administrator before the changes are made 730. The administrator confirms these settings by clicking the "Save Settings" button 735. This sends confirmation to the agent that the network settings have been approved. The agent executes a network CGI that contains the network settings that have been provided to the agent 740. The network change CGI takes these settings and makes the necessary changes to the Windows registry and file system to update the TCP/IP network configuration on the client computer 745. After completing these changes, the CGI returns an HTML request form to the administrators web browser to request a reboot of the client machine 750. A reboot of the Windows® operating system is required anytime that changes are made to the network configuration in order for the changes to take affect. When the administrator confirms the reboot of the remote computer 755, the administrators web browser sends a request to the agent to reboot the computer to the shutdown CGI application 760. The shutdown CGI application tells the Windows® operating system running on the client computer to shutdown and reboot 765. After the client computer has rebooted, the computer will be configured on the new network IP address 770.

Similar techniques will be used to make edits and/or changes to other aspects of the client computer, such as printer selection, file folders, etc.

Figure 8:
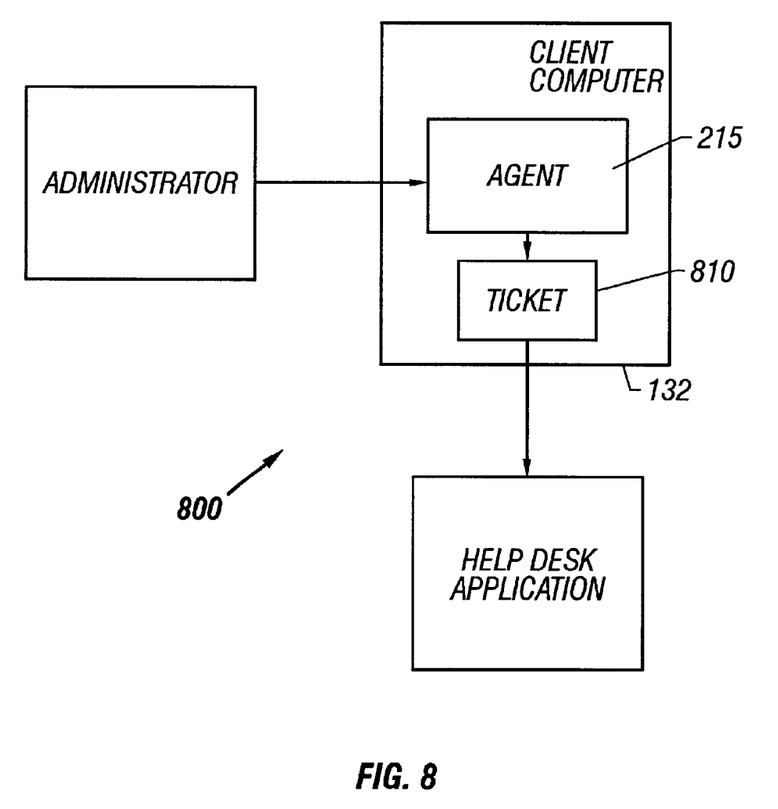
FIG. 8 is a relationship diagram showing a remote managing system with a help desk function.
Figure 9:
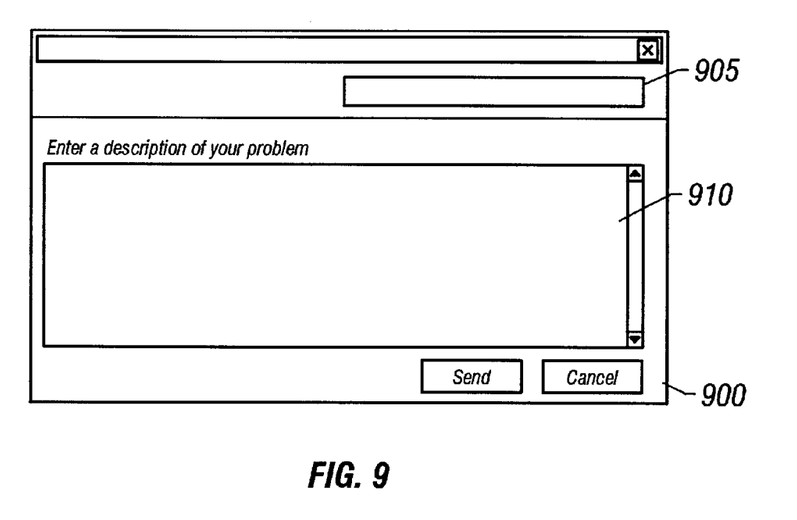
FIG. 9 is a sample screen of a help ticket attachment.

The use of agents on client computers can provide an additional benefit by incorporating help desk software. Help desk software allows companies and organizations to track technology related problems. Through the use of the agent, the end-user can generate a problem report ticket to send to a third party help desk software. In the preferred embodiment, the ticket will contain a URL encoded in it to allow the help desk engineer access to the client computer through a web browser. In addition, the agent can attach system information and diagnostic related information on the ticket, to assist the help desk engineer in diagnosing the problem. In the preferred embodiment, the agent would attach the hardware inventory, software inventory, list of current running processes, list of printers, and list of disk drives along with available free space information. FIG. 8 shows an agent 215 on a client computer 132. The ticket 810 is generated on the client computer with attached information from the agent and the user and is directed to the help desk application via email using the SMTP protocol or via HTTP. The ticket could also be transported to the Help desk system using other messaging transports like MAPI, Microsoft Mail, Lotus Notes, etc. FIG. 9 is a representative sample of a user input attachment to the ticket 900. THE URL code is not shown, however, the origin of the ticket 905 and a description of the problem(s) 910 is placed clearly on the attachment for use by the help desk software engineer.

Figure 10:
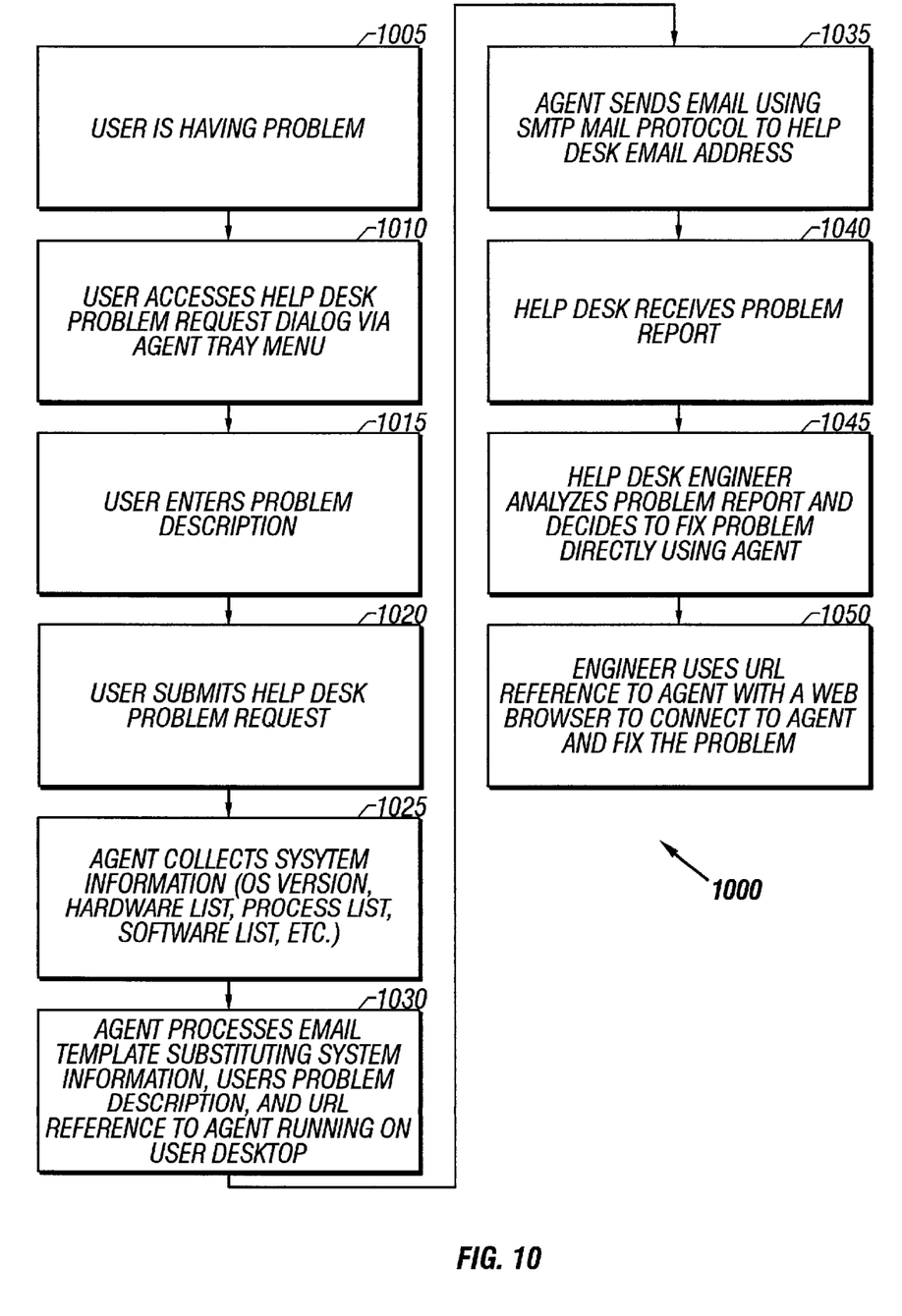
FIG. 10 is a flowchart of the help desk process.

FIG. 10 is a flowchart 1000 illustrating how the agent will direct a problem to the help desk software and the help desk engineer. When the user determines there is a problem 1005, the user can access the help desk problem request form 900 via a menu on the agent. The user enters a description of the problem 1015 and submits the request 1020. The agent collects the system information 1025 and runs an e-mail CGI 1030 that adds pre-determined system information (based on the CGI) to the ticket 810 and attaches the user input 900. The agent then sends e-mail to the help desk e-mail address 1035. The help desk software receives the problem report 1040. The help desk engineer can analyze the problem report and has the option of fixing the problem through the agent 1045. The engineer uses the system information on the ticket 810 to access the agent through a web browser to fix the problem 1050.

Figure 11:
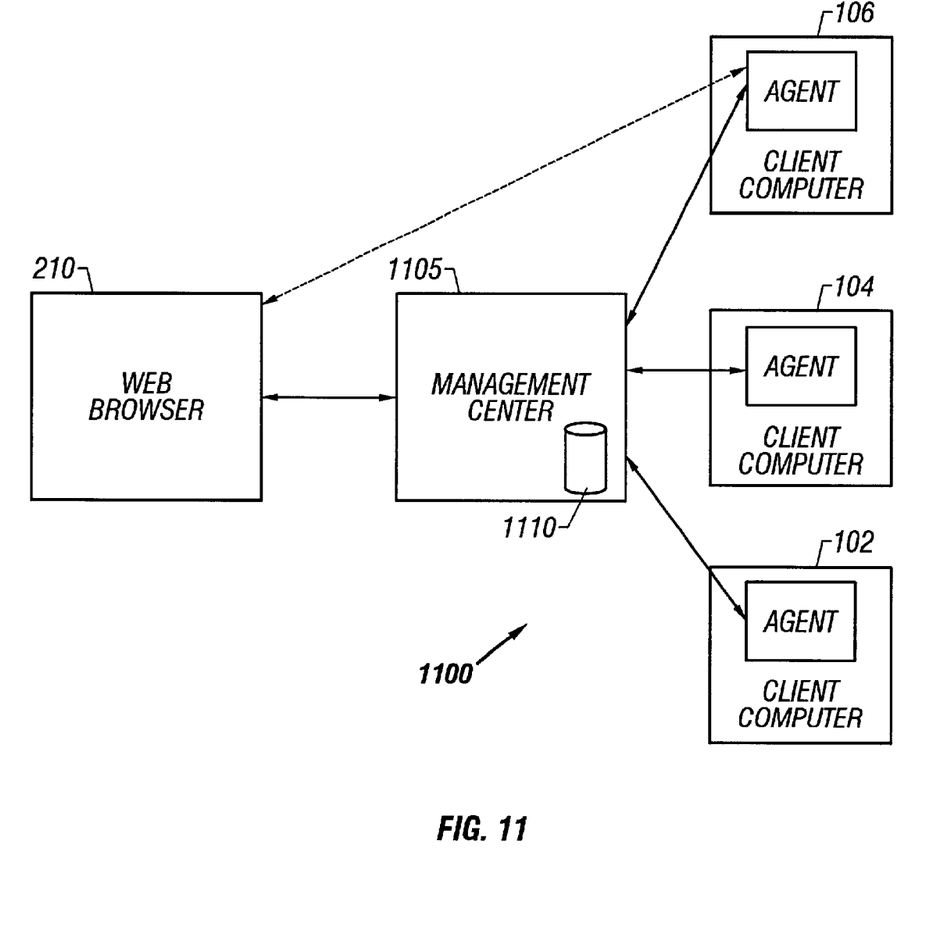
FIG. 11 is a relationship diagram showing a remote managing system with a managing center.

The integration of the agent onto multiple client computers, such as clients 102, 104, and 106 in FIG. 11, allow for an administrator to broadcast changes to the clients as a group (and individually) through a management center system 1100. As shown in FIG. 11, the administrator through a web browser 210 interacts with a management center 1105, which resides on a server. At the management center 1105, the administrator can selectively choose which client computers will receive commands. Therefore, the commands to be broadcasted relate to the same functions that can be performed individually with an agent on a client computer.

The management center 1105 on the server acts as a centralized means to analyze data and perform management related functions on multiple target computers. It can be extremely useful in designating, for example, a printer for a set of client computers that might not incorporate the entire universe of client computers. In that instance, the administrator can review the client numbers on the web page produced by the management center and choose the computers to which the commands are broadcasted. Other potential broadcast functions include collecting information from the agents on the client computers and storing such information in a database 1110, modifying network settings, creating file system folders, and changing registry settings. These functions are in addition to the individual adjustments that can be made through the management center.

The management center can also be used to monitor and collect application response times for end-user applications like enterprise resource planning (ERP) applications. In such a context, the administrator can use various clients to test and record the response time from the client to the server in the context of the application.

The use of agents on client computers can provide another benefit by monitoring application performance on the client computer. The monitoring of application performance, often referred to as application availability monitoring, ensures that end-user applications are "available" and that response times are adequate to maintain a certain level of productivity for the end-user. One application area where this is beneficial is in monitoring ERP planning applications. These types of applications perform mission critical functions within companies. Examples of ERP applications include SAP R/3, Baan ERP, and PeopleSoft. In this embodiment, the agent would monitor response times of client applications as they interact with ERP server applications. This would include collecting response time statistics and storing this data for later historical analysis. The agent can then display these performance statistics to the administrator through the web browser. The historical data can also be graphically presented in a graph, chart, or plot to analyze performance trends and overall availability of the ERP system. The approach can also be used to monitor other standalone applications like Microsoft Office as well as client/server applications like databases applications like Oracle, Sybase, Microsoft SQL, etc.

Figure 12:
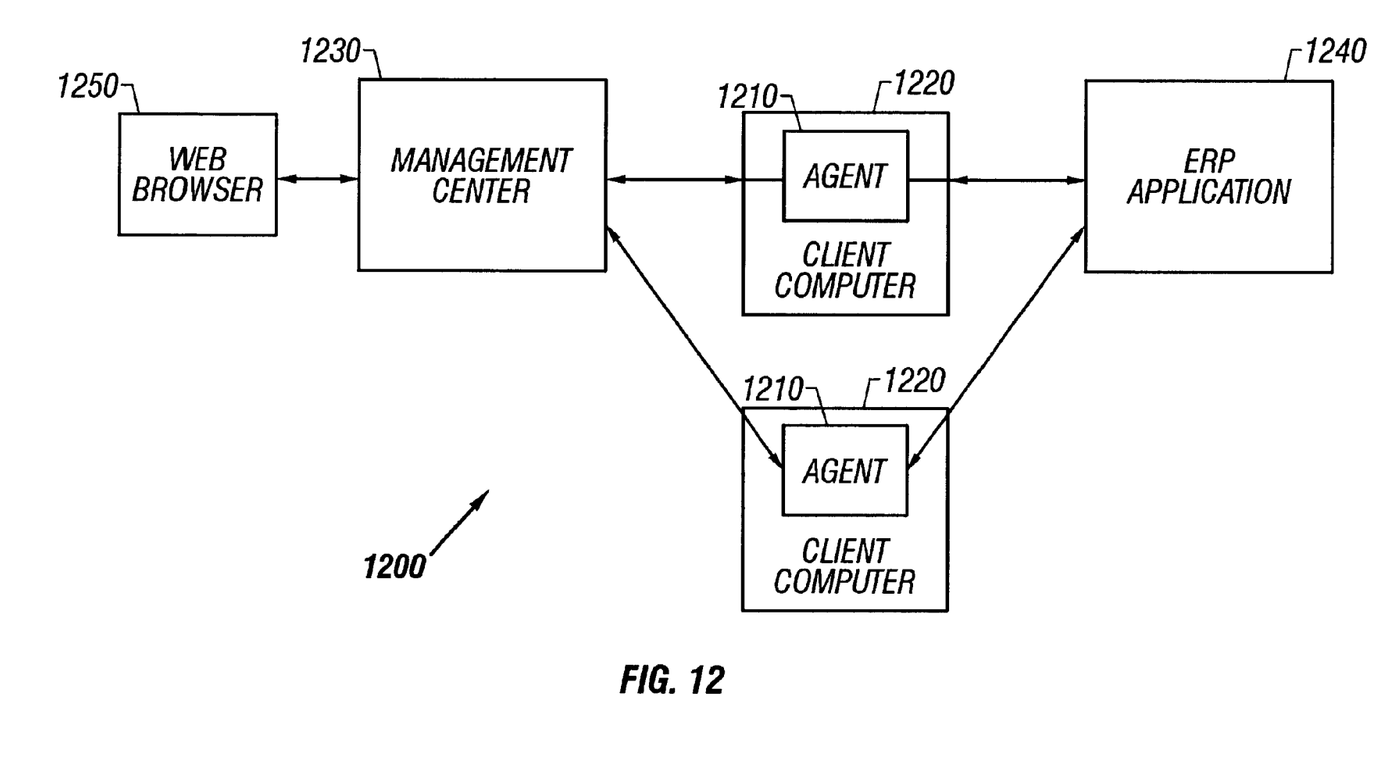
FIG. 12 is a relationship diagram showing a remote managing system with an enterprise resource planning application reporting function.

In the preferred embodiment of ERP monitoring 1200, as shown in FIG. 12, an agent 1210 resides on a client computer 1220. Using the management center (or remotely) 1230, the client computer is directed to make a request of the ERP application 1240 through a web browser 1250. The response time can be determined by the interaction between the client computer and the ERP.

Figure 13:
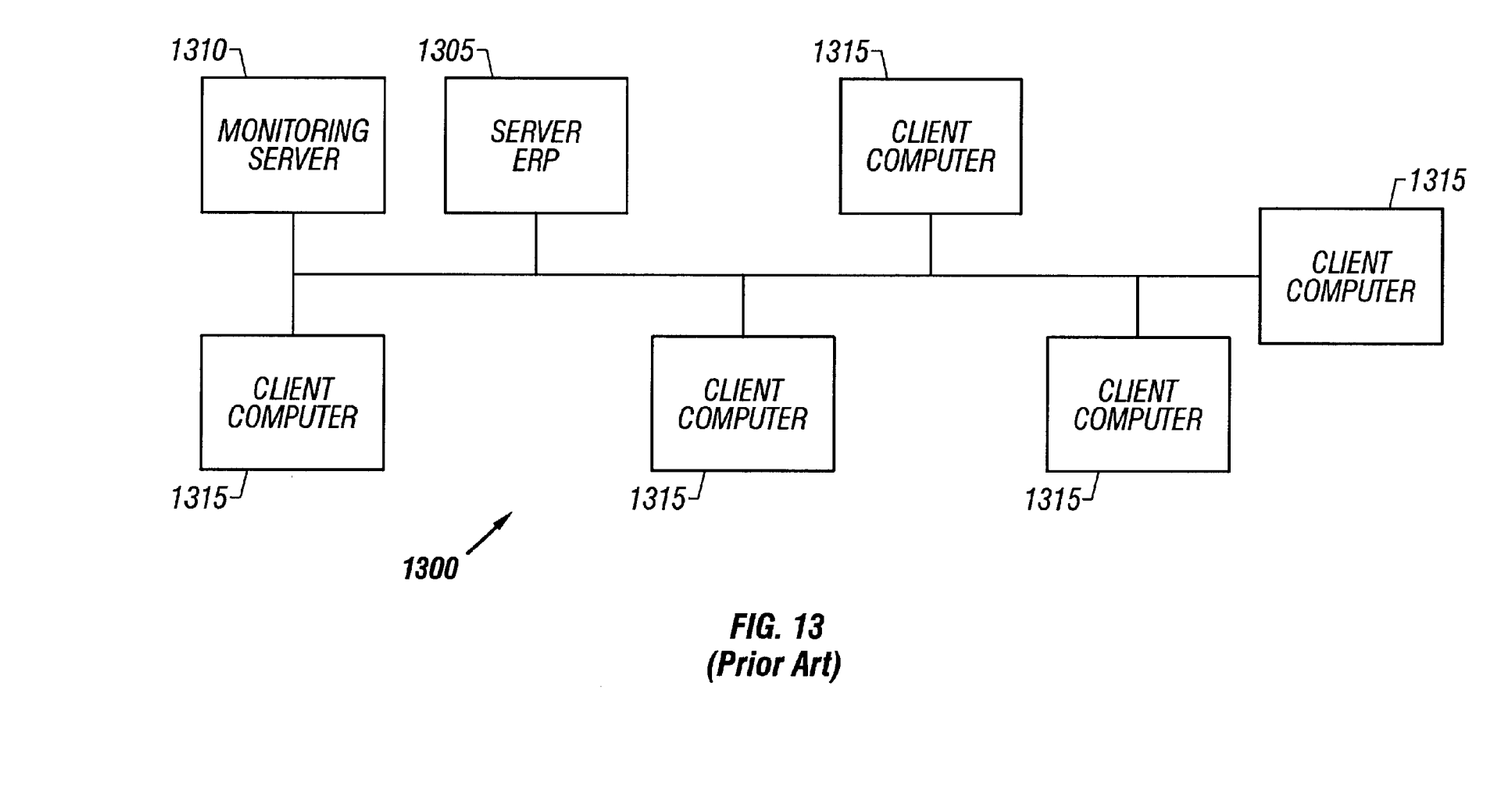
FIG. 13 is a prior art diagram showing enterprise resource planning reporting function.

As shown in FIG. 13, in the prior art 1300 relating to ERP response time determination, response times have been determined by locally monitoring the ERP server 1305 and analyzing network traffic between a monitoring server 1310 and the computer hosting the ERP server. This type of analysis does not accurately reflect the response time in the system because it focuses on the individual response between the ERP server 1305 and the monitoring server 1310 and not the individual client computers in the network 1315. For example, other applications may be running on the local machine that could cause low memory situations that would cause slow response with the remote system. Existing approaches would not be able to detect the situation through the monitoring of the network and ERP server alone.

By using a number of client computers, as illustrated in FIG. 11, the management center 1105 on the server, can determine the response times of the interaction between the client computers and the ERP and therefore, define the overall response time of the system more effectively than the prior art. The management center can also collect and analyze the historical data from the client machines to provide the administrator with additional information on how the client computers have performed over time.

It should be appreciated by those skilled in the art that the specific embodiments disclosed above may be readily utilized as a basis for modifying or designing other methods for carrying out the same purposes of the present invention. It should also be realized by those skilled in the art that such equivalent constructions do not depart from the spirit and scope of the invention as set forth in the appended claims.

What is claimed is:

1. A management system for remotely managing a network of computers, comprising:

a management center residing on a server computer;

at least one client computer, said client computer being networked to the server computer; and at least one agent residing on a client computer, said agent comprising means for obtaining information from the computer operating system;

means for organizing the obtained information; and means for allowing viewing of the obtained information through the network wherein the management center can be accessed by a web browser and a user of the web browser, accessed through the management center, can access the agent through the network.

2. The management system of claim 1 wherein the at least one agent further comprises a means for determining network efficiency.

3. The management system of claim 2 wherein the management center contains a means for compiling the network efficiency information from at least one agent.

4. The management system of claim 3 further comprising an enterprise resource application residing on a computer in the network, wherein the means for compiling performance information can determine the impact of the enterprise resource application on the entire network.

5. The management system in claim 1 wherein the management center comprises:

an editing function for editing computer files;

a selection menu for choosing which agents to send commands; and a command function to send editing commands to selected agents.

6. An agent residing on a computer, wherein the agent is accessible via a web browser, said agent comprising:

means for authenticating the user of the web browser;

means for obtaining information from the computer operating system;

means for organizing the information for viewing by the web browser;

means for a first user to access a help ticket to a help desk software application to describe a problem;

means for a first user to send the help ticket to the help desk software application; and means for a second user to access the agent to fix the problem, wherein the second user is a user of the help desk software application and has obtained information from the help ticket.

7. The agent in claim 6 wherein the means for obtaining information from the computer operating system comprises a Common Gateway Information program.

8. The agent in claim 6 wherein the means for authenticating the user of the web browser is a web server authenticating information against a Windows NT Domain.

9. The agent in claim 6 wherein the means for organizing the information for viewing by the web browser is an HTML template.

10. The agent of claim 6 further comprising:

command means for transmitting commands through the agent to the computer.

11. The agent of claim 10 further comprising:

process means for modifying the computer operating system based on the transmitted commands.

12. The agent of claim 6 further comprising:

means for editing obtained information; and means for changing computer settings to the edited information.

13. The agent of claim 6 wherein the organized information viewed by a web browser is a web page.

14. An agent residing on a computer for managing a network of computers wherein the agent is accessible via a web browser, said agent comprising:

means for authenticating a first user of the web browser;

means for obtaining information from an operating system of the computer;

means for organizing the information from the operating system for viewing by the web browser;

means for enabling a second user to access a help ticket from a help desk software application to describe a problem;

means for enabling the second user to send the help ticket to the help desk software application; and means for enabling the first user to access the agent for solving the problem, wherein the first user is a user of the help desk software application and has obtained information from the help ticket.

15. The agent of claim 14 wherein the means for obtaining information from the operating system comprises a Common Gateway Information program.

16. The agent of claim 14 wherein the means for authenticating the first user comprises a web server authenticating information against a Windows NT Domain.

17. The agent of claim 14 wherein the means for organizing the information from the operating system comprises an HTML template.

18. The agent of claim 14 further comprising:

command means for transmitting one or more commands through the agent to the computer.

19. The agent of claim 18 further comprising:

process means for modifying the operating system based on the one or more commands.

20. The agent of claim 14 further comprising:

means for editing the obtained information; and means for changing one or more settings of the computer according to the edited information.

21. The agent of claim 25 wherein the means for organizing the information comprises a web page.

* * * * *